US008414172B2

(12) United States Patent
Lee

(10) Patent No.: US 8,414,172 B2
(45) Date of Patent: Apr. 9, 2013

(54) HEADLAMP FOR VEHICLE

(75) Inventor: Byung Pyll Lee, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 405 days.

(21) Appl. No.: 12/759,888

(22) Filed: Apr. 14, 2010

(65) Prior Publication Data

US 2011/0051447 A1 Mar. 3, 2011

(30) Foreign Application Priority Data

Aug. 26, 2009 (KR) ........................ 10-2009-0079403

(51) Int. Cl.
*B60Q 1/04* (2006.01)

(52) U.S. Cl. ........................................ 362/547; 362/507

(58) Field of Classification Search .................. 362/547, 362/487, 507, 538, 218, 264, 345
See application file for complete search history.

(56) References Cited

U.S. PATENT DOCUMENTS

| | | | | |
|---|---|---|---|---|
| 2002/0044455 | A1 | 4/2002 | Ozawa et al. | |
| 2003/0058656 | A1 | 3/2003 | Yamaguchi | |
| 2004/0202007 | A1* | 10/2004 | Yagi et al. ..................... | 362/545 |
| 2010/0277941 | A1* | 11/2010 | Frey et al. ...................... | 362/547 |
| 2011/0134655 | A1* | 6/2011 | Ohtani et al. ................. | 362/546 |

* cited by examiner

*Primary Examiner* — Jong-Suk (James) Lee
*Assistant Examiner* — Leah S MacChiarolo
(74) *Attorney, Agent, or Firm* — Saliwanchik, Lloyd & Eisenschenk

(57) ABSTRACT

A headlamp for vehicles is disclosed. The headlamp for vehicles includes a lamp housing having an opening; an exterior lens disposed on the opening of the lamp housing; a light source received in the lamp housing to emit light, a cooling fin received in the lamp housing to cool the light source, a conductive line connected at one end thereof to the cooling fin, and a conductive film connected to the other end of the conductive line and mounted on an inner surface of the exterior lens. The headlamp can eliminate a cooling fin or a cooling fan, thereby enabling reduction in size, weight and power consumption of a cooling device and can achieve prevention of moisture generation and immediate removal of moisture without a separate moisture removing device.

14 Claims, 5 Drawing Sheets

HEADLAMP FOR VEHICLE

CROSS-REFERENCE TO RELATED APPLICATION

This application claims the benefit under 35 U.S.C. §119 of Korean Patent Application No. 10-2009-0079403, filed Aug. 26, 2009, which is hereby incorporated by reference in its entirety.

BACKGROUND OF THE INVENTION

1. Field of the Invention

The present invention relates to a headlamp for vehicles and, more particularly, to a headlamp for vehicles that enables size and weight reduction of a cooling device therein.

2. Description of the Related Art

In general, lamps emit light when receiving power and headlamps provided to vehicles radiate light so that a driver may see in front of the vehicle. Recently, a headlamp has been developed which employs a light emitting diode as a light source and has high brightness with less power consumption.

FIG. 1 is a schematic section view of a conventional headlamp for vehicles and FIG. 2 is a perspective view of a cooling device of the conventional headlamp.

Referring to FIGS. 1 and 2, a headlamp 50 for vehicles is located at a lower side of an engine room and includes a lamp housing 20 which is open at a front side thereof. The lamp housing 20 accommodates a light source 31, a reflector plate 32, and an interior lens 33 therein.

The light source 31 emits light when receiving power, and the reflector plate 32 is located behind the light source 31 to reflect light emitted from the light source 31 in front of the reflector plate 32. The interior lens 33 is located in front of the light source 31 and reflects the light towards the outside. The lamp housing 20 is provided with a cooling device that includes a cooling fin 34 and a cooling fan 35 to cool the light source 31.

The opening of the lamp housing 20 is covered by an exterior lens 40. Light from the light source 31 is radiated to the outside through the interior and exterior lenses 33, 40 directly or after being reflected by the reflector plate 32.

Here, it should be noted that the aforementioned technique is related to the background art of the invention and is not a conventional technique.

A conventional headlamp for vehicles requires a cooling device for cooling a light source. Particularly, when an LED is used as the light source, it is necessary for the cooling device to have sufficient cooling efficiency for cooling the LED which is vulnerable to heat. Such a cooling device includes a cooling fin and a cooling fan, which generally have large sizes and incur high power consumption to ensure appropriate cooling efficiency. Furthermore, the conventional headlamp requires a separate moisture removing device to remove moisture generated inside the headlamp.

Therefore, there is a need to solve such problems of the conventional headlamp.

BRIEF SUMMARY

The present invention is conceived to solve the problems of the related art, and an aspect of the invention is to provide a headlamp for vehicles that enables reduction in size, weight and power consumption of a cooling device and can achieve prevention of moisture generation and immediate removal of moisture without a separate moisture removing device.

In accordance with an aspect of the invention, a headlamp for vehicles includes a lamp housing having an opening; an exterior lens disposed on the opening of the lamp housing; a light source received in the lamp housing to emit light; a cooling fin received in the lamp housing to cool the light source; a conductive line connected at one end thereof to the cooling fin; and a conductive film connected to the other end of the conductive line and mounted on an inner surface of the exterior lens.

The conductive line may include a first conductive line connected at one end thereof to an upper portion of the cooling fin and connected at the other end thereof to an upper portion of the conductive film, and a second conductive line connected at one end thereof to a lower portion of the cooling fin and connected at the other end thereof to a lower portion of the conductive film.

The conductive film may include a transparent material.

The conductive film may be a CNT electrode film.

The conductive line may include copper.

In accordance with another aspect of the invention, a headlamp for vehicles includes a lamp housing having an opening; an exterior lens disposed on the opening of the lamp housing; a light source received in the lamp housing to emit light; a cooling fin received in the lamp housing to cool the light source; a conductive line connected at one end thereof to the cooling fin; and a conductive film connected to the other end of the conductive line and inserted into the exterior lens.

The conductive line may include a first conductive line connected at one end thereof to an upper portion of the cooling fin and connected at the other end thereof to an upper portion of the conductive film, and a second conductive line connected at one end thereof to a lower portion of the cooling fin and connected at the other end thereof to a lower portion of the conductive film.

The conductive film may include a transparent material.

In accordance with a further aspect of the invention, a headlamp for vehicles includes a lamp housing having an opening; an exterior lens disposed on the opening of the lamp housing; a light source received in the lamp housing to emit light; a conductive line connected at one end thereof to the light source; and a conductive film connected to the other end of the conductive line and mounted on an inner surface of the exterior lens.

The conductive line may include a first conductive line connected at one end thereof to an upper portion of the light source and connected at the other end thereof to an upper portion of the conductive film, and a second conductive line connected at one end thereof to a lower portion of the light source and connected at the other end thereof to a lower portion of the conductive film.

The conductive film may include a transparent material.

In accordance with yet another aspect of the invention, a headlamp for vehicles includes a lamp housing having an opening; an exterior lens disposed on the opening of the lamp housing; a light source received in the lamp housing to emit light; a conductive line connected at one end thereof to the light source; and a conductive film connected to the other end of the conductive line and inserted into the exterior lens.

The conductive line may include a first conductive line connected at one end thereof to an upper portion of the light source and connected at the other end thereof to an upper portion of the conductive film, and a second conductive line connected at one end thereof to a lower portion of the light source and connected at the other end thereof to a lower portion of the conductive film.

The conductive film may include a transparent material.

BRIEF DESCRIPTION OF THE DRAWINGS

The above and other aspects, features, and advantages of the invention will become apparent from the following detailed description of embodiments of the invention given in conjunction with the accompanying drawings, in which.

DETAILED DESCRIPTION

Hereinafter, exemplary embodiments of the invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 3:
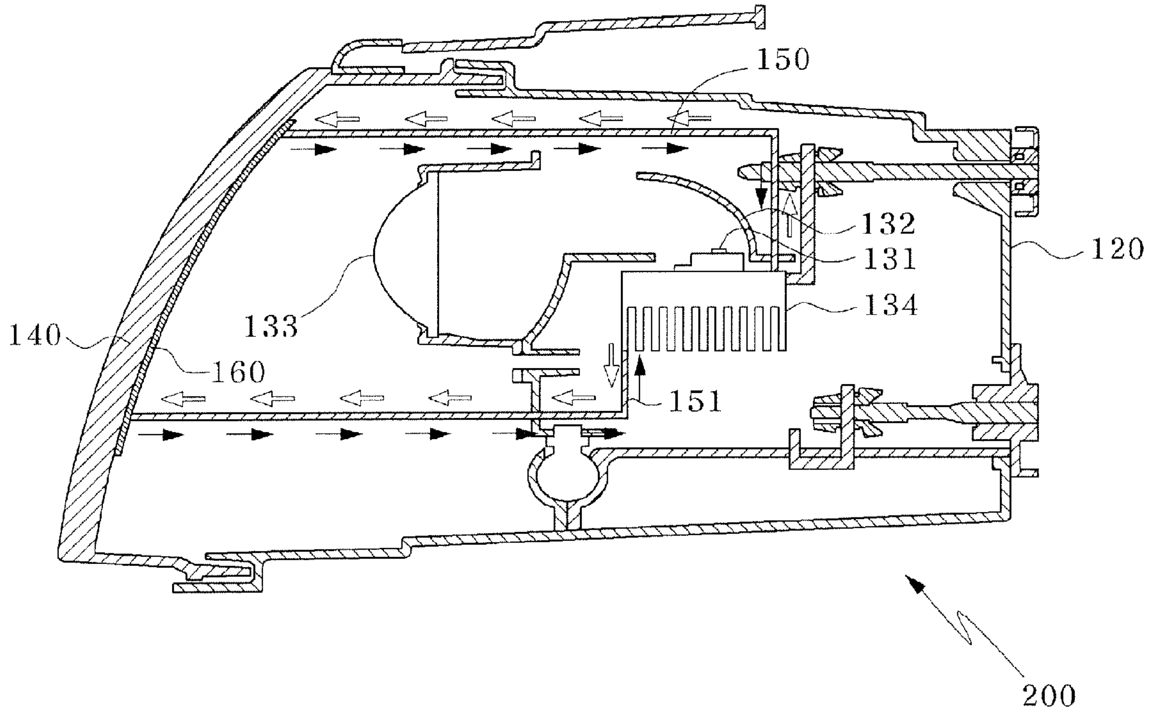
FIG. 3 is a schematic sectional view of a headlamp for vehicles in accordance with a first embodiment of the present invention.
Figure 4:
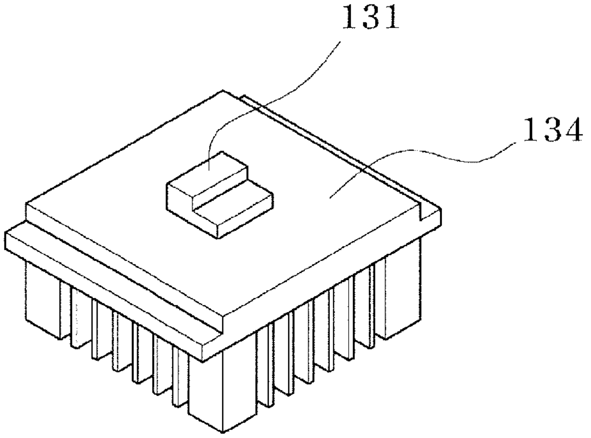
FIG. 4 is a perspective view of the headlamp for vehicles in accordance with the first embodiment of the present invention.

Referring to FIGS. 3 and 4, a headlamp 200 for vehicles in accordance with a first embodiment of the invention includes a lamp housing 120, an exterior lens 140, a light source 131, a cooling fin 134, conductive lines 150, 151, and a conductive film 160.

The lamp housing 120 defines an outer appearance of the headlamp 200 and is located on a front side of a vehicle. The lamp housing 120 has an opening at a front side thereof. The opening of the lamp housing 120 is covered by the exterior lens 140.

The exterior lens 140 is disposed on the opening of the lamp housing 120 to protect components of the lamp housing 120. The exterior lens 140 may have a variety of shapes to provide pleasant appearances to consumers.

The light source 131 is received in the lamp housing 120 to generate and emit light. The light emitted from the light source 131 is reflected forwardly by a reflector plate 132 which surrounds the light source 131. The light source 131 may include a light emitting diode (LED) which provides greater overall luminous efficacy.

Since the LED emits light inside a closed space, that is, inside the headlamp 200, constant emission of light from the LED causes temperature increase therein. Thus, the headlamp is provided with a cooling device for lowering the temperature of the LED.

In the first embodiment, the cooling device includes the cooling fin 134, the conductive lines 150, 151, and the conductive film 160.

The cooling fin 134 is located under the light source 131 to cool the light source 131. In this embodiment, the cooling fin 134 contacts the light source 131 to dissipate heat from the light source 131. Consequently, the temperature of the light source 131 is prevented from increasing.

Figure 1:
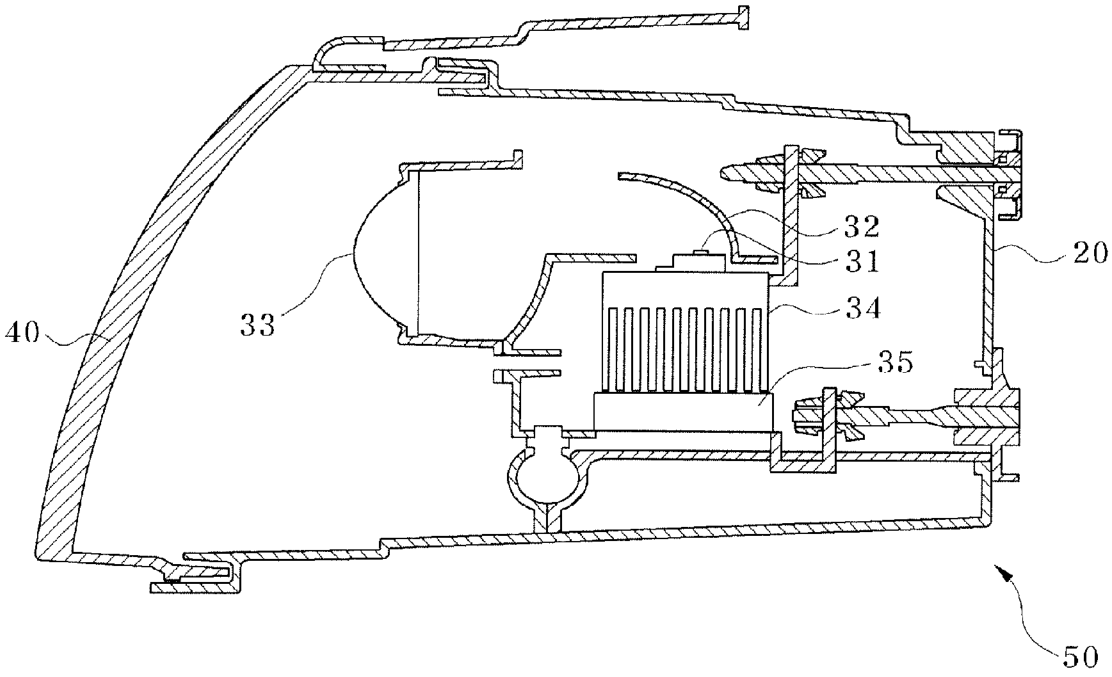
FIG. 1 (PRIOR ART)
FIG. 1 is a schematic section view of a conventional headlamp for vehicles.
Figure 2:
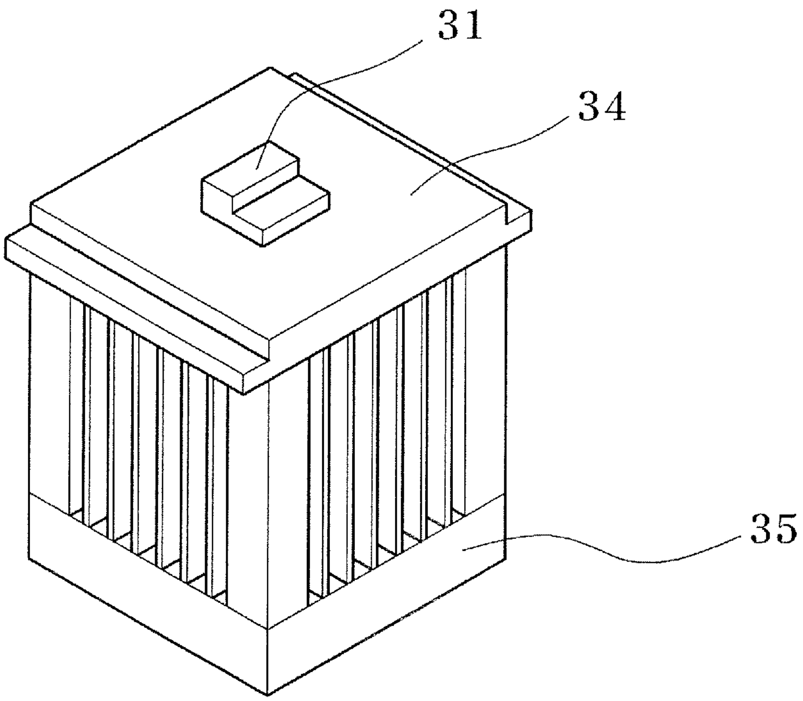
FIG. 2 (PRIOR ART)
FIG. 2 is a perspective view of a cooling device of the conventional headlamp.

According to this embodiment, the cooling fin 134 has a smaller size than that of the conventional headlamp. The conventional headlamp requires not only the large cooling fin 34 (see FIG. 2) but also the separate cooling fan 35 (see FIG. 2) for cooling the cooling fin in order to decrease the temperature of the light source 31. However, according to this embodiment, since the cooling fin 134 is connected to the conductive film 160 via the conductive lines 150, 151, the cooling fan for cooling the cooling fin 134 can be omitted. Furthermore, the cooling fin 134 having a smaller size than that of the conventional headlamp can provide the same or superior cooling efficiency as or to that of the conventional cooling fin.

The headlamp 200 for vehicles is used under conditions of frequent vibration. Thus, it is necessary for the cooling fan 35 to have resistance to noise and vibration as well as cooling capabilities. However, since the cooling fan 35 can be omitted in this embodiment, the possibility of durability deterioration caused by noise and vibration is decreased, thereby enhancing quality reliability of the headlamp 200.

Each of the conductive lines 150, 151 is connected at one end thereof to the cooling fin 134 and at the other end thereof to the conductive film 160. According to the first embodiment, the conductive lines 150, 151 comprise a first conductive line 150 and a second conductive line 151. The first conductive line 150 is connected at one end thereof to an upper portion of the cooling fin 134 and at the other end thereof to an upper portion of the conductive film 160. The second conductive line 151 is connected at one end thereof to a lower portion of the cooling fin 134 and at the other end thereof to a lower portion of the conductive film 160. In this embodiment, two conductive lines 150, 151 are illustrated, but the invention is not limited thereto. That is, it should be understood that the headlamp may include, for example, three or more conductive lines.

The conductive lines 150, 151 comprise copper having high thermal conductivity to transfer heat from the cooling fin 134 to the conductive film 160. Namely, the conductive lines 150, 151 comprise metal materials such as copper or copper alloys.

The conductive film 160 is mounted on an inner surface of the exterior lens 140. The conductive lines 150, 151 are connected to the conductive film 160 to transfer heat from the cooling fin 134 to the conductive film 160.

Since the conductive film 160 is mounted on the inner surface of the exterior lens 140, the conductive film 160 contacts external air with the exterior lens 140 interposed therebetween. As a result, the heat contacting the external air is dissipated to the outside. For this purpose, the conductive film 160 may also be formed of a material having high conductivity.

The conductive film 160 comprises a transparent material. Since the conductive film 160 is mounted on the inner surface of the exterior lens 140, it is located in a path through which light emitted from the light source 131 passes. Thus, the conductive film 160 comprises the transparent material so as not to block passage of light therethrough. For example, a transparent CNT (carbon nano tube) film having high thermal conductivity may be used as the conductive film 160.

Figure 5:
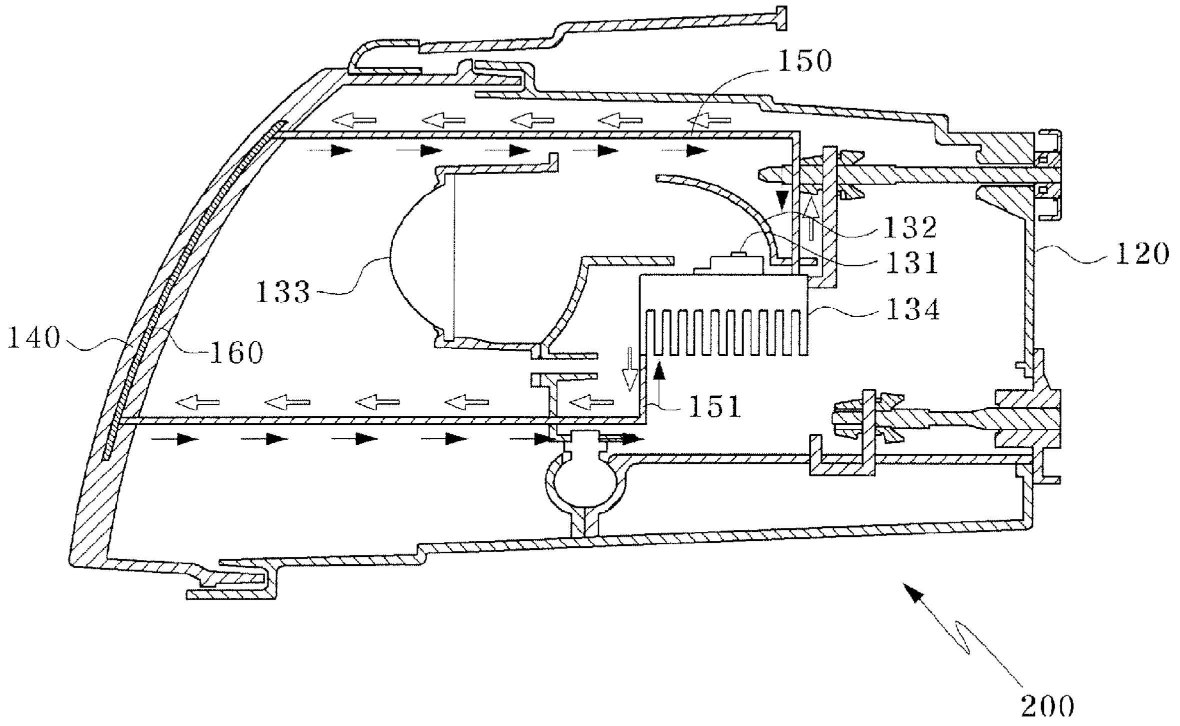
FIG. 5 is a schematic sectional view of a headlamp for vehicles in accordance with a second embodiment of the present invention.

Next, the headlamp 200 for vehicles according to a second embodiment will be described with reference to FIG. 5. Herein, a description of the same components of the second embodiment as those of the first embodiment will be omitted.

The headlamp 200 for vehicles according to the second embodiment includes a lamp housing 120, an exterior lens 140, a light source 131, a cooling fin 134, conductive lines 150, 151, and a conductive film 160.

The conductive film 160 is inserted into the exterior lens 140. The conductive film 160 may be integrally formed with the exterior lens 140 by insert injection. A through-hole (not shown) may be formed through the exterior lens 140 to connect the conductive film 160 to the conductive lines 150, 151. Since the conductive film 160 is connected to the conductive lines 150, 151 via the through-hole, heat of the cooling fin 134 is transferred to the conductive film 160 through the conductive lines 150, 151.

Since the conductive film 160 is inserted into the exterior lens 140, the conductive film 160 contacts external air with the front side of the exterior lens 140 interposed therebetween. As a result, heat contacting the external air is dissipated to the outside. For this purpose, the conductive film 160 may also be formed of a material having high conductivity.

The conductive film 160 comprises a transparent material so as not to block passage of light therethrough. For example, a transparent CNT (carbon nano tube) film having high thermal conductivity may be used as the conductive film 160.

Each of the conductive lines 150, 151 is connected at one end thereof to the cooling fin 134 and at the other end thereof to the conductive film 160. According to the second embodiment, the conductive lines 150, 151 comprise a first conductive line 150 and a second conductive line 151. The first conductive line 150 is connected at one end thereof to an upper portion of the cooling fin 134 and at the other end thereof to an upper portion of the conductive film 160 through the through-hole. The second conductive line 151 is connected at one end thereof to a lower portion of the cooling fin 134 and at the other end thereof to a lower portion of the conductive film 160 through the through-hole.

Figure 6:
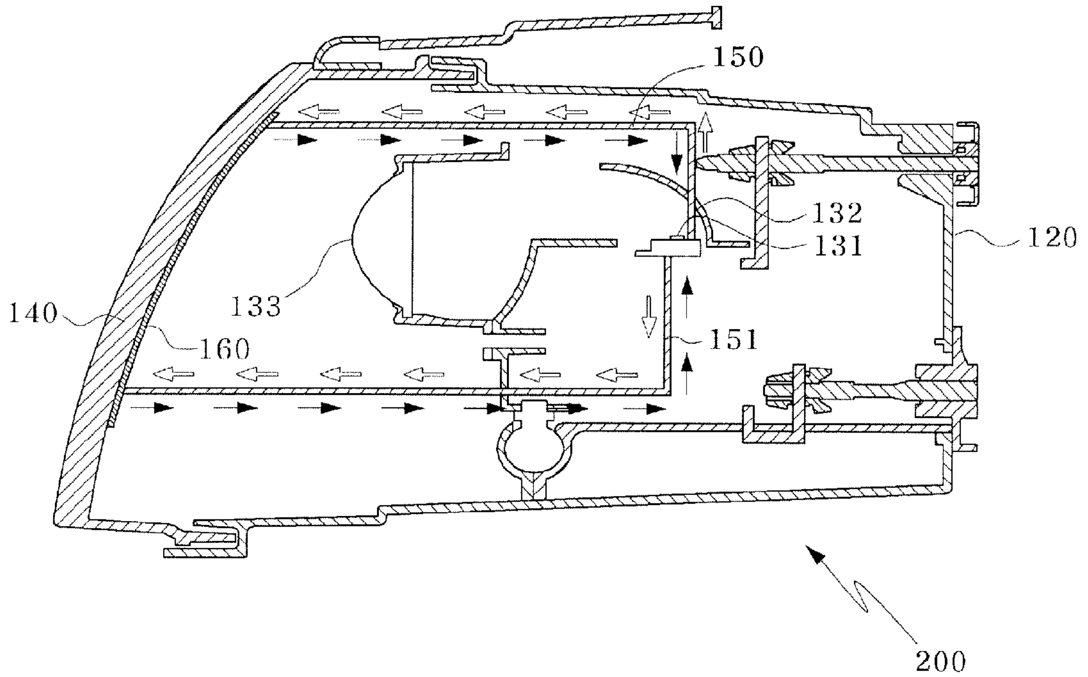
FIG. 6 is a schematic sectional view of a headlamp for vehicles in accordance with a third embodiment of the present invention.

Next, the headlamp 200 for vehicles according to a third embodiment will be described with reference to FIG. 6. Herein, a description of the same components of the third embodiment as those of the first embodiment will be omitted.

The headlamp 200 for vehicles according to the third embodiment includes a lamp housing 120, an exterior lens 140, a light source 131, conductive lines 150, 151, and a conductive film 160.

In the third embodiment, a cooling device of the headlamp 200 includes the conductive lines 150, 151, and the conductive film 160.

According to the third embodiment, the cooling device can be reduced in size compared with that of the conventional headlamp. The conventional headlamp (see FIG. 2) requires not only the large cooling fin 34 but also the separate cooling fan 35 for cooling the cooling fin in order to decrease the temperature of the light source 31. However, according to this embodiment, since the light source 131 generating heat is connected to the conductive film 160 via the conductive lines 150, 151, the cooling fin 34 and the cooling fan 35 can be omitted, thereby enabling size reduction of the cooling device for the headlamp.

Furthermore, since the cooling fan 35 is omitted in this embodiment, the possibility of durability deterioration caused by noise and vibration is decreased, thereby enhancing quality reliability of the headlamp 200 for vehicles.

Each of the conductive lines 150, 151 is connected at one end thereof to the light source 131 and at the other end thereof to the conductive film 160. According to the third embodiment, the conductive lines 150, 151 comprise a first conductive line 150 and a second conductive line 151. The first conductive line 150 is connected at one end thereof to an upper portion of the light source 131 and at the other end thereof to an upper portion of the conductive film 160. The second conductive line 151 is connected at one end thereof to a lower portion of the light source 131 and at the other end thereof to a lower portion of the conductive film 160.

The conductive lines 150, 151 comprise copper having high thermal conductivity to transfer heat from the light source 131 to the conductive film 160. Namely, the conductive lines 150, 151 comprise metal materials such as copper or copper alloys.

The conductive film 160 is mounted on an inner surface of the exterior lens 140. The conductive lines 150, 151 are connected to the conductive film 160 to transfer heat from the light source 131 to the conductive film 160.

Since the conductive film 160 is mounted on the inner surface of the exterior lens 140, the conductive film 160 contacts external air with the exterior lens 140 interposed therebetween. As a result, the heat contacting the external air is dissipated to the outside. For this purpose, the conductive film 160 may also be formed of the material having high conductivity.

The conductive film 160 comprises a transparent material so as not to block passage of light therethrough. For example, a transparent CNT (carbon nano tube) film having high thermal conductivity may be used as the conductive film 160.

Figure 7:
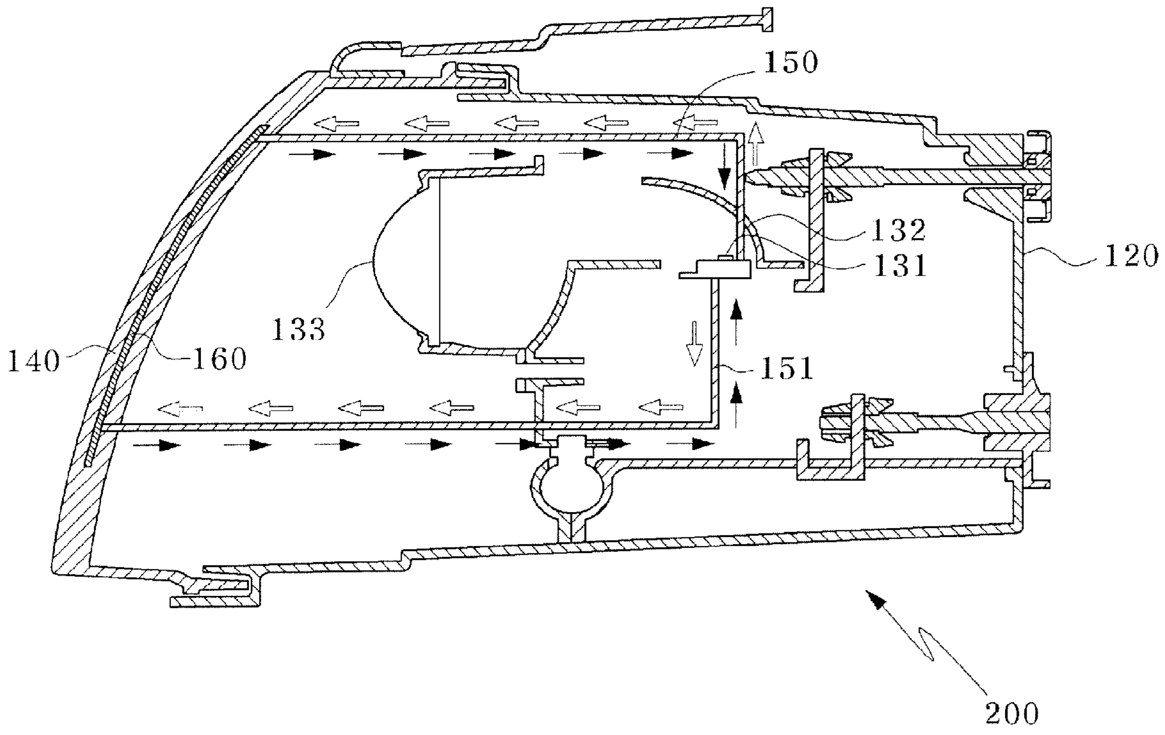
FIG. 7 is a schematic sectional view of a headlamp for vehicles in accordance with a fourth embodiment of the present invention.

Next, the headlamp 200 for vehicles according to a fourth embodiment will be described with reference to FIG. 7. Herein, a description of the same components of the fourth embodiment as those of the first embodiment will be omitted.

The headlamp 200 for vehicles according to the fourth embodiment includes a lamp housing 120, an exterior lens 140, a light source 131, conductive lines 150, 151, and a conductive film 160.

Each of the conductive lines 150, 151 is connected at one end thereof to the light source 131 and at the other end thereof to the conductive film 160. According to this embodiment, the conductive lines 150, 151 comprise a first conductive line 150 and a second conductive line 151. The first conductive line 150 is connected at one end thereof to an upper portion of the light source 131 and at the other end thereof to an upper portion of the conductive film 160. The second conductive line 151 is connected at one end thereof to a lower portion of the light source 131 and at the other end thereof to a lower portion of the conductive film 160.

The conductive film 160 is inserted into the exterior lens 140. The conductive film 160 may be integrally formed with the exterior lens 140 by insert injection. A through-hole (not shown) may be formed through the exterior lens 140 to connect the conductive film 160 to the conductive lines 150, 151. Since the conductive film 160 is connected to the conductive lines 150, 151 via the through-hole, heat of the light source 131 is transferred to the conductive film 160 through the conductive lines 150, 151.

Since the conductive film 160 is inserted into the inner surface of the exterior lens 140, the conductive film 160 contacts external air with the front side of the exterior lens 140 interposed therebetween. As a result, heat contacting the external air is dissipated to the outside. For this purpose, the conductive film 160 may also be formed of the material having high conductivity.

The conductive film 160 comprises a transparent material so as not to block passage of light therethrough. For example, a transparent CNT film having high thermal conductivity may be used as the conductive film 160.

Next, an operational principle of the headlamp for vehicles according to the embodiments of the invention will be described with reference to FIGS. 3 to 7.

The light source 131 is switched on by operation of a drive module (not shown) electrically connected thereto. Then, the light source 131 emits light, which in turn is reflected by the reflector plate 132 and irradiated in front of a vehicle through the interior and exterior lenses 133, 140.

When the light source 131 emits light, heat is generated from the light source 131. Herein, the heat generated upon emission of light will be referred to as "luminescence heat." The luminescent heat is dissipated while being transferred to the cooling fin 134 that contacts the light source 131. Further, the luminescent heat transferred to the cooling fin 134 is transferred to the conductive film 160 through the conductive lines 150, 151 and is dissipated when contacting external air with the exterior lens 140 interposed between the conductive film 160 attached to the exterior lens 140 and the external air. In other words, the luminescent heat from the light source 131 is subjected to primary heat dissipation through the cooling fin 134 and to secondary heat dissipation through the conductive lines 150, 151, the conductive film 160 and the exterior lens 140. Consequently, it is possible to achieve sufficient cooling of the light source 131 by maximizing dissipation of the luminescent heat.

Further, since the luminescent heat of high temperature is supplied to the exterior lens 140 through the conductive film 160, it is possible to prevent moisture from being generated on the exterior lens 140 or to immediately remove moisture in the case that the moisture is generated thereon. Accordingly, it is possible to achieve prevention of moisture generation and immediate removal of moisture without a separate moisture removing device.

As apparent from the description, according to the embodiments, the headlamp for vehicles can eliminate a cooling fan, thereby enabling reduction in size, weight and power consumption of the cooling device. Further, since the headlamp for vehicles does not employ the cooling fan, the headlamp can significantly lower the possibility of durability deterioration resulting from noise and vibration, thereby enhancing reliability.

Further, according to the embodiments, the headlamp for vehicles can minimize or eliminate the cooling fin, thereby enabling reduction in size, weight and power consumption of the cooling device.

Furthermore, according to the embodiments of the invention, the headlamp for vehicles can achieve prevention of moisture generation and immediate removal of moisture without a separate moisture removing device.

Although some embodiments have been provided to illustrate the invention in conjunction with the drawings, it will be apparent to those skilled in the art that the embodiments are given by way of illustration only, and that various modifications, changes and substitutions can be made without departing from the spirit and scope of the invention. Further, the description of the headlamp for vehicles as provided herein is only one example of the invention, and the configuration of the headlamp according to the invention can be applied to other devices. The scope of the invention should be defined only by the accompanying claims and equivalents thereof.

What is claimed is:

1. A headlamp for vehicles comprising:

a lamp housing having an opening;

an exterior lens disposed on the opening of the lamp housing;

a light source received in the lamp housing to emit light;

a cooling fin received in the lamp housing to cool the light source;

a conductive line connected at one end thereof to the cooling fin; and a conductive film connected to the other end of the conductive line and mounted on an inner surface of the exterior lens, wherein heat generated by said light source is dissipated to the outside via said conductive film.

2. The headlamp according to claim 1, wherein the conductive line comprises:

a first conductive line connected at one end thereof to an upper portion of the cooling fin and connected at the other end thereof to an upper portion of the conductive film; and a second conductive line connected at one end thereof to a lower portion of the cooling fin and connected at the other end thereof to a lower portion of the conductive film.

3. The headlamp according to claim 1, wherein the conductive film comprises a transparent material.

4. The headlamp according to claim 3, wherein the conductive film comprises a CNT electrode film.

5. The headlamp according to claim 1, wherein the conductive line comprises copper.

6. A headlamp for vehicles comprising:

a lamp housing having an opening;

an exterior lens disposed on the opening of the lamp housing;

a light source received in the lamp housing to emit light;

a cooling fin received in the lamp housing to cool the light source;

a conductive line connected at one end thereof to the cooling fin; and a conductive film connected to the other end of the conductive line and inserted into the exterior lens, wherein heat generated by said light source is dissipated to the outside via said conductive film.

7. The headlamp according to claim 6, wherein the conductive line comprises:

a first conductive line connected at one end thereof to an upper portion of the cooling fin and connected at the other end thereof to an upper portion of the conductive film; and a second conductive line connected at one end thereof to a lower portion of the cooling fin and connected at the other end thereof to a lower portion of the conductive film.

8. The headlamp according to claim 6, wherein the conductive film comprises a transparent material.

9. A headlamp for vehicles comprising:

a lamp housing having an opening;

an exterior lens disposed on the opening of the lamp housing;

a light source received in the lamp housing to emit light;

a conductive line connected at one end thereof to the light source; and a conductive film connected to the other end of the conductive line and mounted on an inner surface of the exterior lens, wherein heat generated by said light source is dissipated to the outside via said conductive film.

10. The headlamp according to claim 9, wherein the conductive line comprises:

a first conductive line connected at one end thereof to an upper portion of the light source and connected at the other end thereof to an upper portion of the conductive film; and a second conductive line connected at one end thereof to a lower portion of the light source and connected at the other end thereof to a lower portion of the conductive film.

11. The headlamp according to claim 9, wherein the conductive film comprises a transparent material.

12. A headlamp for vehicles comprising:

a lamp housing having an opening;

an exterior lens disposed on the opening of the lamp housing;

a light source received in the lamp housing to emit light;

a conductive line connected at one end thereof to the light source; and a conductive film connected to the other end of the conductive line and inserted into the exterior lens, wherein heat generated by said light source is dissipated to the outside via said conductive film.

13. The headlamp according to claim 12, wherein the conductive line comprises:

a first conductive line connected at one end thereof to an upper portion of the light source and connected at the other end thereof to an upper portion of the conductive film; and a second conductive line connected at one end thereof to a lower portion of the light source and connected at the other end thereof to a lower portion of the conductive film.

14. The headlamp according to claim 12, wherein the conductive film comprises a transparent material.

* * * * *